(12) United States Patent
Gray et al.

(10) Patent No.: US 11,097,277 B2
(45) Date of Patent: Aug. 24, 2021

(54) COVER MEMBER WITH ORIENTATION INDICIA

(71) Applicant: LEICA BIOSYSTEMS MELBOURNE PTY LTD., Mount Waverly (AU)

(72) Inventors: Adam Michael Gray, Surrey Hills (AU); Michael Stephen Glynn, Wheelers Hill (AU)

(73) Assignee: LEICA BIOSYSTEMS MELBOURNE PTY LTD, Mount Waverley (AU)

( * ) Notice: Subject to any disclaimer, the term of this patent is extended or adjusted under 35 U.S.C. 154(b) by 373 days.

(21) Appl. No.: 14/425,339

(22) PCT Filed: Aug. 30, 2013

(86) PCT No.: PCT/AU2013/000986
§ 371 (c)(1),
(2) Date: Mar. 3, 2015

(87) PCT Pub. No.: WO2014/036593
PCT Pub. Date: Mar. 13, 2014

(65) Prior Publication Data
US 2015/0224494 A1    Aug. 13, 2015

Related U.S. Application Data

(60) Provisional application No. 61/696,529, filed on Sep. 4, 2012.

(51) Int. Cl.
*B01L 3/00* (2006.01)
*G02B 21/34* (2006.01)
(Continued)

(52) U.S. Cl.
CPC .............. *B01L 3/508* (2013.01); *G01N 1/312* (2013.01); *G02B 21/34* (2013.01); *G06K 9/6202* (2013.01);
(Continued)

(58) Field of Classification Search
CPC .. B01L 3/50825; B01L 3/50853; B01L 3/545; B01L 2300/041; G01N 1/312; G02B 21/34
(Continued)

(56) References Cited

U.S. PATENT DOCUMENTS 3,851,972 A    12/1974  Smith et al.
5,561,556 A    10/1996  Weissman
(Continued)

FOREIGN PATENT DOCUMENTS

WO    03/045560 A2    6/2003
WO    2004/001389 A1  12/2003

OTHER PUBLICATIONS

International Search Report for PCT/AU2013/000986 dated Oct. 3, 2013 [PCT/ISA/210].

*Primary Examiner* — Jill A Warden
*Assistant Examiner* — Dwayne K Handy
(74) *Attorney, Agent, or Firm* — Sughrue Mion, PLLC

(57) ABSTRACT

A cover member for use in the treatment of a sample on a substrate is disclosed. The cover member has fluid flow features and is adapted for use in an instrument, such as a laboratory instrument. The cover member comprises at least one orientation feature detectable by the instrument for ascertaining an orientation of the cover member. An automated method for detecting orientation of a cover member in a sample treatment assembly is also disclosed, in which a processor compares data corresponding to one or more images collected from the sample treatment assembly, with (Continued)

data representing a reference image to determine if a cover member is in the sample treatment assembly.

13 Claims, 4 Drawing Sheets

(51) Int. Cl.
| | | |
|---|---|---|
| *G01N 1/31* | (2006.01) | |
| *G06T 7/70* | (2017.01) | |
| *G06K 9/62* | (2006.01) | |
| *G01N 35/04* | (2006.01) | |

(52) U.S. Cl.
CPC ........... *G06T 7/70* (2017.01); *B01L 2200/025* (2013.01); *B01L 2300/021* (2013.01); *B01L 2300/04* (2013.01); *G01N 2035/0491* (2013.01)

(58) Field of Classification Search
USPC .................................................. 422/568, 569
See application file for complete search history.

(56) References Cited

U.S. PATENT DOCUMENTS

| | | |
|---|---|---|
| 5,963,368 A | 10/1999 | Domanik et al. |
| 6,352,861 B1 | 3/2002 | Copeland et al. |
| 7,006,674 B1 | 2/2006 | Zahniser et al. |
| 7,864,380 B2 | 1/2011 | Descour et al. |
| 8,315,445 B2 | 11/2012 | Sorenson et al. |
| 2003/0099580 A1 | 5/2003 | Pressman et al. |
| 2003/0112330 A1 | 6/2003 | Yuri et al. |
| 2004/0052408 A1 | 3/2004 | Sharman et al. |
| 2004/0202577 A1 | 10/2004 | McNeil et al. |
| 2005/0191214 A1 | 9/2005 | Tseung et al. |
| 2006/0088928 A1 | 4/2006 | Sweet et al. |
| 2006/0153736 A1 | 7/2006 | Kalra et al. |
| 2006/0265133 A1 | 11/2006 | Cocks et al. |
| 2008/0201082 A1 | 8/2008 | Tohma et al. |
| 2009/0214088 A1 | 8/2009 | Sorenson et al. |
| 2010/0073766 A1 | 3/2010 | Angros |

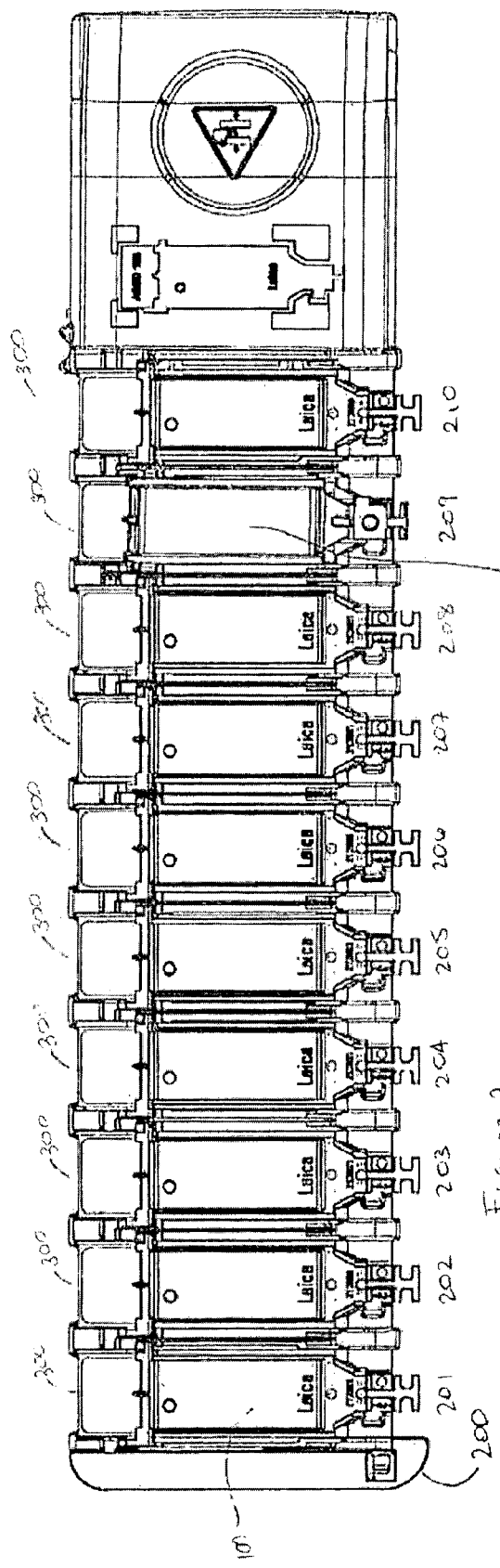
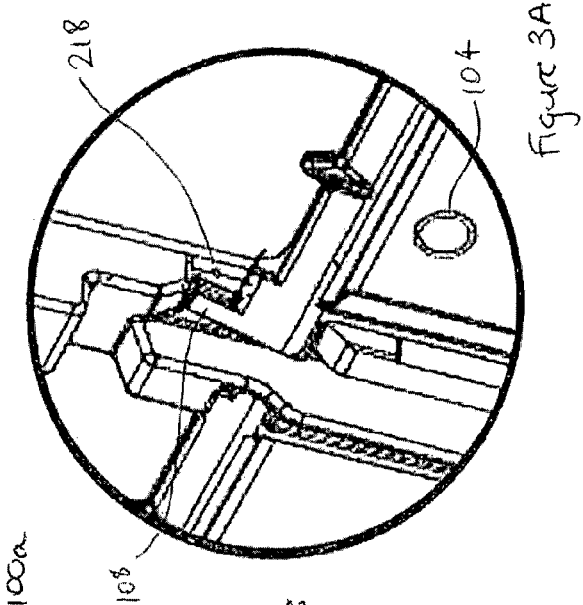
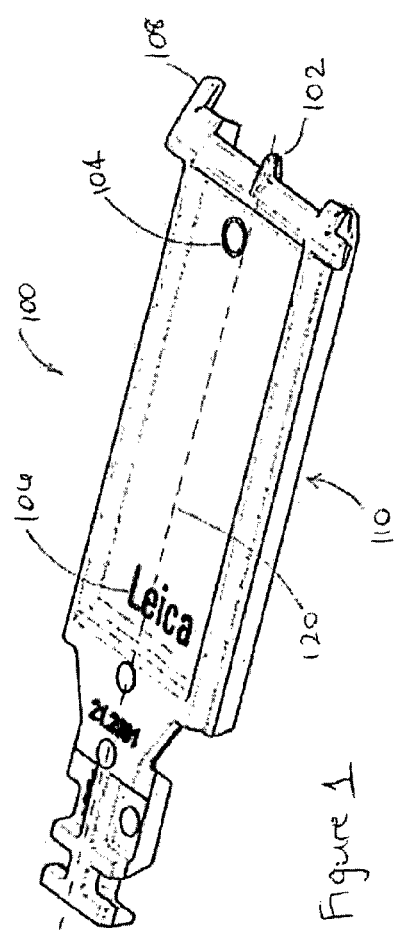

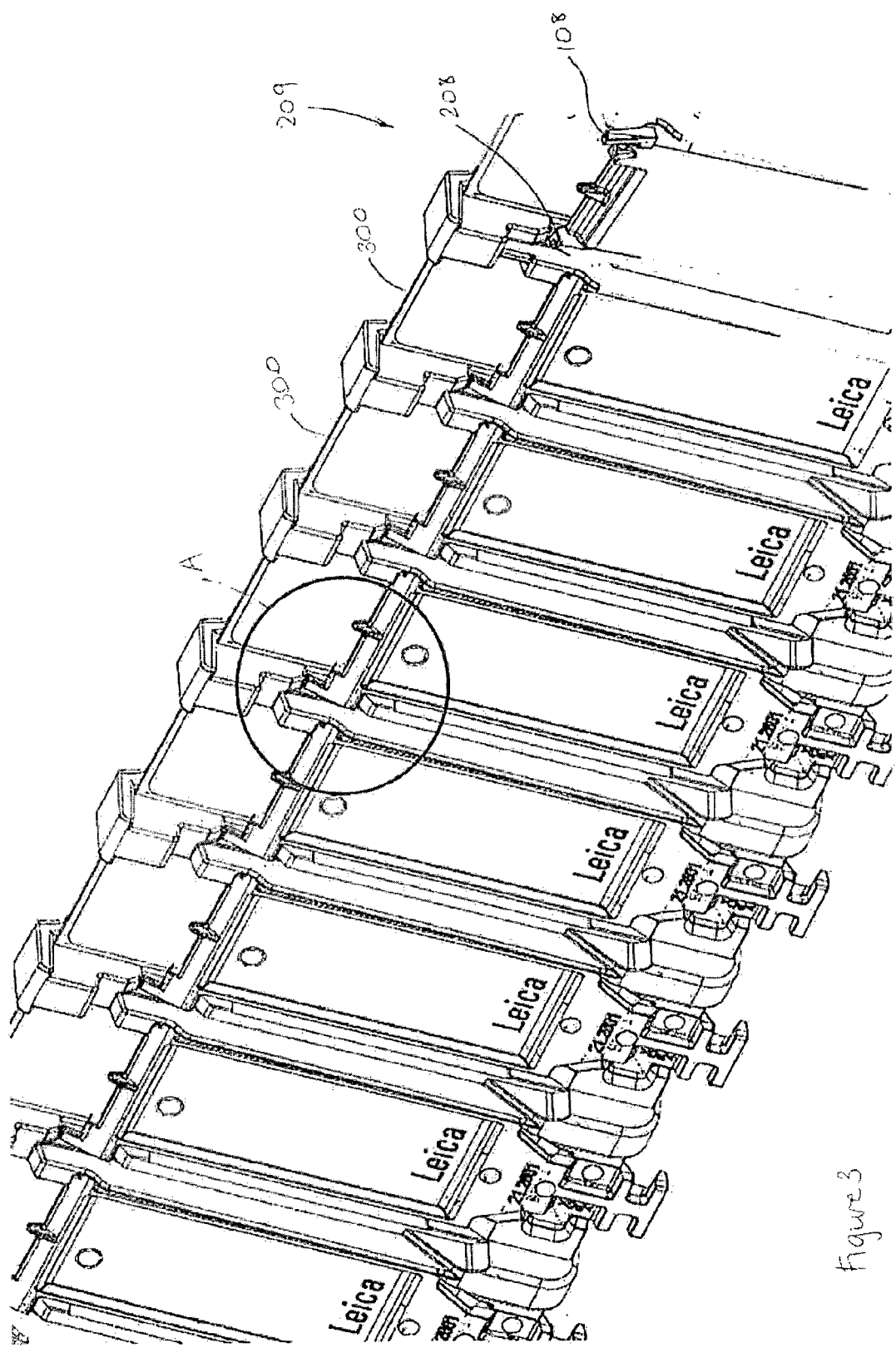

COVER MEMBER WITH ORIENTATION INDICIA

CROSS REFERENCE TO RELATED APPLICATIONS

This application is a National Stage of International Application No. PCT/AU2013/000986 filed Aug. 30, 2013, claiming priority based on U.S. Provisional Application No. 61/696,529 filed Sep. 4, 2012, the contents of all of which are incorporated herein by reference in their entirety.

FIELD OF THE INVENTION

The present invention relates to a cover member for use in the treatment of samples such as biological tissue. It relates particularly but not exclusively to a cover member for use with a sample treatment instrument and which has features that enable the instrument, or a human operating the instrument, to determine the orientation of the cover member in the instrument, including whether or not a cover member is present.

BACKGROUND TO THE INVENTION

Immunohistochemical staining and in situ nucleic acid analysis are tools used in histological diagnosis and the study of tissue morphology. Immunohistochemical staining involves a series of treatment steps conducted on a tissue sample mounted on a glass slide to highlight by selective staining, certain morphological indicators of disease states.

Instrumentation and automated sample processing systems exist for automating steps in sample staining and other treatment processes. Some systems employ a cover member with physical features which, when placed over the sample on the slide, form a reaction chamber. The cover member may also have features for controlling the application and transfer of fluid reagent within the reaction chamber. Given the high cost of reagents, the reaction chamber is often very small (e.g. a few microliters in volume) and defined by fine rails on one side of the member. In some cases, these rails are nearly undetectable upon visual inspection, particularly by the inexperienced.

In contrast, deeper contours on the opposing side of the cover member (e.g. to minimise material consumption during manufacture without sacrificing strength or durability) are typically easier to see. These deeper contours may mistakenly be identified as defining the reaction chamber by less experienced or unskilled workers, which can lead to the cover member being applied to the slide wrong way up. This can lead to problems including loss of instrument time, loss of reagent and deterioration of the sample, to name a few.

It would be desirable to minimise the risk of the cover member being applied to the slide in an incorrect orientation (or not at all).

The discussion of the background to the invention included herein, including reference to documents, acts, materials, devices, articles and the like, is intended to explain the context of the present invention. This is not to be taken as an admission or a suggestion that any of the material referred to was published, known or part of the common general knowledge in the United States of America as at the priority date of any of the claims.

SUMMARY OF THE INVENTION

It is known to use features such as barcodes or labels on slides containing biological samples e.g. to ensure that slides processed by an instrument are correctly handled when they exit the instrument after processing. However, little or no work has been done by way of employing identifiable features on a cover member to ascertain the orientation of the cover member in the instrument.

Viewed from one aspect, the present invention provides a cover member for use in treatment of a sample on a substrate, such as a slide, the cover member having fluid flow features and being adapted for use in an instrument, wherein the cover member comprises at least one orientation feature detectable by the instrument for ascertaining an orientation of the cover member.

Ascertaining an orientation of the cover member may involve determining whether the cover member is correctly oriented in the instrument, or whether it is incorrectly oriented e.g. inverted and/or rotated. Ascertaining the orientation of the cover member may also involve determining automatically the presence or absence of a cover member over a slide in the instrument, prior to commencement of treatment.

An orientation feature may be a machine-readable feature such as a RFID tag, magnet or the like, or a feature that may be recognised using image capturing means and image matching algorithms employed by a processor in the instrument. Alternatively/additionally, an orientation feature may include a mechanical feature such as a notch or protrusion, pin or the like which substantially precludes the cover member from being incorrectly oriented within the instrument or a tray into which multiple slides may be loaded for use in the instrument. Alternatively/additionally, the orientation feature may be identifiable by a human, as is e.g. a word, number, label, image, line, pattern, arrow, physical marking, tactile feature or the like.

In one embodiment, the orientation feature may comprise or be incorporated into the shape of the cover member or a portion thereof. Alternatively/additionally, the orientation feature may be incorporated into a fluid input area of the cover member or a nib or other dispense point for receiving reagent.

In some embodiments, the orientation feature may comprise a colour or coloured element wherein, correct orientation of the cover member makes a colour or coloured element on the cover member visible to the operator and/or detectable by the instrument. By way of example, when the cover member is correctly oriented, the visible surface of the cover member or a portion thereof may be coloured green. Conversely, when incorrectly oriented a visible surface of the cover member or a portion thereof may be coloured red to designate incorrect orientation.

The orientation feature may be moulded onto the cover member surface, or it may be embossed, adhered, fused, etched, applied or otherwise incorporated on or into the cover member surface, or within the cover member material itself.

In one embodiment, the orientation feature is a visible feature detectable by the instrument, and is substantially circular in shape. In an embodiment, the orientation feature comprises an annulus on a surface of the cover member, the annulus having a substantially semi-circular cross section. The annulus may have any suitable geometry and may be located anywhere which does not interfere with the other functional aspects of the cover member, such as a reagent reservoir or nib onto which reagent is dispensed. The geometry may be e.g. a radius of about 2 mm with feature height of about 0.2 mm although these dimensions are not to be taken as limiting and radii of e.g. 3 mm, 4 mm, 5 mm up to about 10 or 11 mm may be acceptable, while feature heights of zero (where the feature is incorporated into the surface) to about 4 mm may be appropriate, depending on the other features of the cover member and instrument with which it is to be used.

In a preferred embodiment, an orientation feature on the cover member is disposed off-centre relative to at least one dimension, preferably a centre-line of the cover member. This ensures that, in the event that the cover member is transparent and is wrongly oriented e.g. by inverting around a longitudinal axis, the orientation feature will not be in the correct location for detection by the instrument.

In an embodiment, the cover member is adapted for use in a sample holder, such as a slide tray, receivable by the instrument. Here, the orientation feature may be e.g. a protrusion configured to cooperate with a corresponding recess of the sample holder when the cover member is correctly oriented in the sample holder. This enables a user to ascertain by inspection if the cover member is correctly oriented since the cover member will not lie flat on the slide in the sample holder unless the cover member is correctly oriented with the protrusion cooperating with the corresponding recess in the sample holder. Sample holders may be configured to hold a single sample or a plurality of samples such as but not limited to e.g. 3, 5, 10, 15, 20, 30 or more samples. Since each sample is provided on a slide which must be covered by an individual cover member, the slide holder has a corresponding number of recesses as slides, so that the correct orientation of each cover member in the sample holder can be ascertained individually. Alternatively/additionally, the sample holder may comprise a protrusion configured to cooperate with a corresponding recess of a cover member when the cover member is correctly oriented in the sample holder. Typically, sample holder would have a separate protrusion for each cover member so that the orientation of each cover member in the sample holder can be ascertained individually.

In one embodiment, the cover member incorporates a magnetic portion that, when applied in the correct orientation, permits alignment of the cover member in the sample holder. The opposing polarities when the cover member is applied in the incorrect orientation results in a deflection of the cover member or magnetic force of repulsion highlighting the incorrect orientation the of the cover member.

In one embodiment, the cover member incorporates a magnetic portion such that it triggers a sensor, for example, a Hall Effect sensor, when correctly oriented. This enables automatic detection of correct orientation (and/or incorrect orientation) by the instrument or a device associated with the instrument of a sample holder, In one embodiment, the cover member incorporates a portion with a degree of opacity that triggers a sensor, for example, a photo-diode or optocoupler, when correctly oriented or conversely, when incorrectly oriented.

In one embodiment, the orientation feature may incorporate a read/write functionality, such as an RFID tag or other such feature that provides the ability to sense the presence of the cover member, read information from the cover member and/or write information to the feature on the cover member.

In one embodiment, the orientation feature on the cover member may include functionality to provide communication between the cover member and a controller located in a different location such as onboard the instrument, connected to the instrument wired/wirelessly or otherwise connected. In one embodiment, the controller may be located in a remote geographical location relative to the cover member.

In one embodiment, cover member may further encode information relevant to the usage of the cover member, including but not limited to, the history of the cover member including the number of times the cover member has been used in a staining apparatus, the number of wash cycles the cover member has undergone or any other information that may be relevant to the useable life cycle of the cover member.

In an embodiment, the orientation feature may be utilized to calibrate the cover member and/or instrument to compensate for variations in the laboratory environment. Calibration may provide for correction of the effect of variables such as lighting, position within the laboratory and other such variable that may impact on the quality of the imaging of the orientation feature.

In an embodiment, an average reference, such as a moving average reference may be provided to facilitate calibration. Alternatively/additionally, the feature may facilitate calibration of other aspects of the instrument, such as the dispense point of reagent onto the instrument, for example a nib or other dispense point on the cover member.

Viewed from another aspect, the present invention provides an automated method for detecting orientation of a cover member in a sample treatment assembly, the method including the steps of: receiving at a processor data representing one or more images collected from the sample treatment assembly; receiving at the processor data representing a reference image; operating the processor to compare the reference image data and the collected image data to produce a correlation value; and determining the presence of a cover member in the sample treatment assembly when the correlation value exceeds a threshold value. The reference image data represents an image which, if the cover member is correctly oriented, will be detected on the cover member.

In one embodiment, the received data representing collected images pertains to a plurality of substrates in the sample treatment assembly which have been imaged simultaneously. In another embodiment, the received data representing collected images pertains to a plurality of substrates in the sample treatment assembly which have been imaged sequentially.

Machine-readable code embodying instructions executable by a processor to perform the methods described herein may also be provided.

BRIEF DESCRIPTION OF THE DRAWINGS

The present invention will now be described in greater detail with reference to the accompanying drawings. It is to be understood that the embodiments shown are examples only and are not to be taken as limiting the scope of the invention as defined in the claims appended hereto.

FIG. 1 is a schematic illustration of a cover member according to an embodiment of the invention.

FIG. 2 is a schematic illustration showing cover members in a sample holder, with one of the cover members in an incorrect orientation.

FIG. 3 is an isometric view of part of a sample holder loaded with slides and cover members.

FIG. 3A is an enlarged view of the region A identified in FIG. 3.

DETAILED DESCRIPTION

Figure 5:
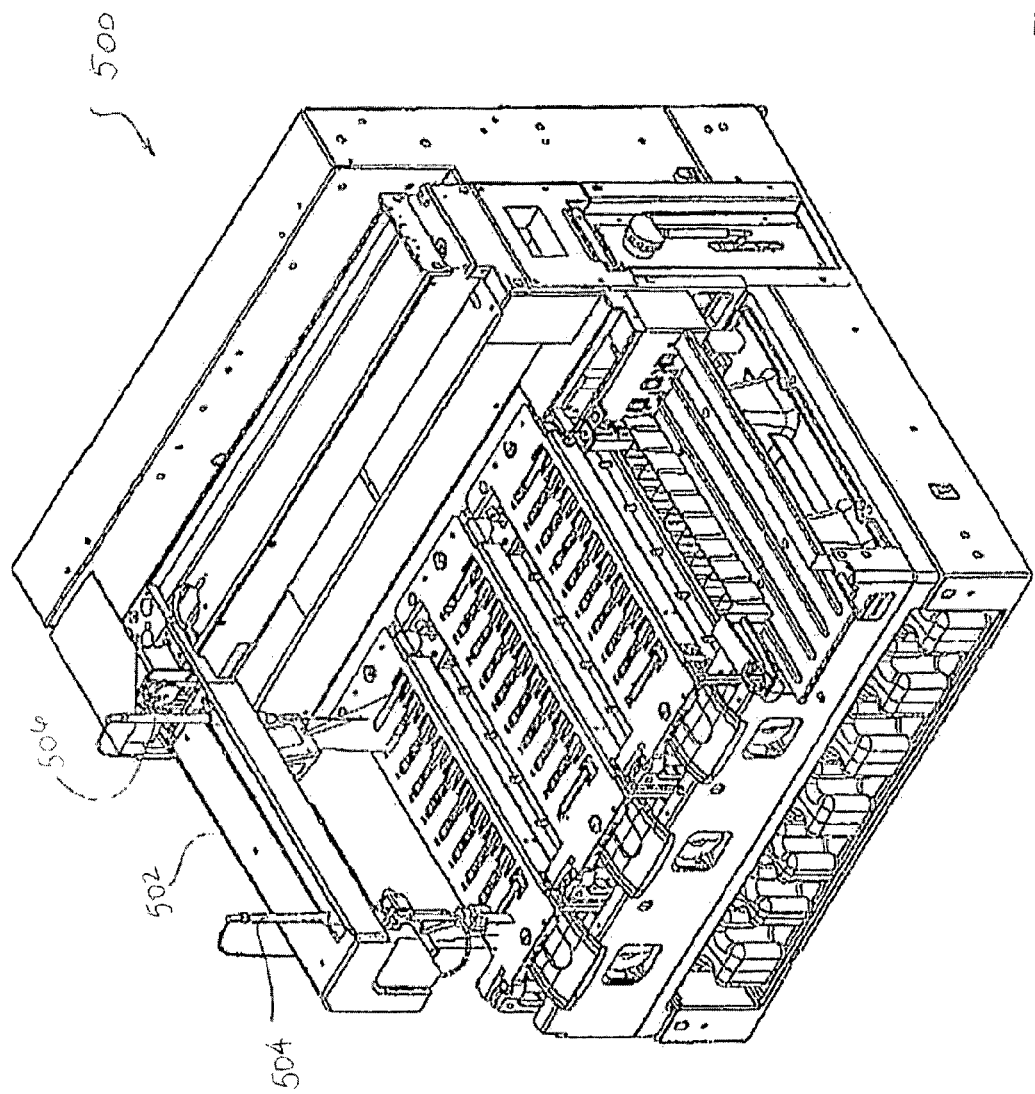
FIG. 5 is a schematic illustration of an automated instrument with which the cover member and/or the method of the present invention may be used.

Referring firstly to FIG. 1, there is shown a cover member 100 of the type that is used for processing a sample a substrate such as a slide 300, using an automated instrument 500. An example of an automated instrument, with the external casing removed is illustrated in FIG. 5. FIG. 5 shows internal components of the instrument including robotic gantry 502 and probes 504, 506 for dispensing reagent into the designated areas of slide staining modules when loaded in the instrument. The instrument illustrated in FIG. 5 is not yet loaded with slide staining modules in the form of a sample holder prepared with a plurality of slides and respective cover members.

The cover member has fluid control features such as nib 102 onto which reagent is dispensed for reactions inside reaction chamber 110. In the embodiment illustrated, three orientation features are incorporated: (1) ring 104 which is configured for optical recognition by the instrument with which the cover member is used, (2) human and/or machine readable label 106 represented by the word "Leica", and (3) a tab 108 in the form of a projection which is configured to cooperate with a recess in a sample holder with which the cover member is used.

FIG. 2 shows a sample holder 200 in the form of a slide tray, which holds ten slides each identified by reference numeral 300. It is to be understood however that the slide holder may hold as few as 1, 2 or 3 slides, or as many as 12, 15, 20 etc. The sample holder has slots 201, 202, . . . 210 which contain slides 300 and cover members. Slide slots 201 to 208 and 210 each contain the cover member 100 in the correction orientation, ascertainable by the label "Leica" being oriented so that it can be read from left to right. If the label was inverted, the label "Leica" would not be visible (as it would be facing the slide rather than the user) and in the case of transparent cover members, it would be reversed so that on visual inspection, it is obvious that the cover member is not correctly oriented within the sample holder 200. In slot 209, it is easily ascertained that the cover member 100a is incorrectly orientated because the label "Leica" is not visible.

Furthermore, In FIG. 2 cover member 100a is not correctly positioned within the slot 209 of sample holder 200. This is readily ascertainable because cover member 100a is not in the orientation seen in slots 201 to 208 and 210. Cover member 100a cannot be placed in the sample holder 200 because the orientation is incorrect (it has been inverted) and tab 108 precludes the cover member 100a from sitting correctly in the tray.

FIG. 3 provides an isometric view of part of the sample holder in FIG. 2, with an encircled region labelled A, providing closer detail of the tab 108. An enlarged version of region A is shown in FIG. 3A which also shows recess 218 in the sample holder 200 in which the tab 108 sits when the cover member is correctly orientated. In slot 209 of the sample holder, the tab 108 on the cover member prevents the cover member from sitting correctly in the slide slot.

In a preferred embodiment, the machine-readable orientation feature 104 is a ring configured to be identified by the instrument 500. The feature may be readily visible to the human operator but need not be. Thus, it may be replaced by or incorporated into a magnetic, radio frequency, infra-red, or other machine-readable element that can be adapted for automatic detection by the instrument. In the embodiment illustrated, ring 104 is a substantially circular annular feature that is detectable by the instrument prior to performing a processing run on samples in the instrument. This enables the instrument system to notify a user that it detects a cover member is not present on a slide, or the cover member has been incorrectly loaded, i.e. in the wrong orientation.

Ideally, the feature 104 is positioned off-centre from the centreline 120 of the cover member 100 so that if the cover member is transparent and inverted, the feature 104 will not appear in the image collected by the instrument. Preferably, the feature is annular with a substantially semi-circular cross section. In the embodiment illustrated the annulus has a cross-sectional radius of about 2 mm giving rise to a feature height of 0.2 mm which is detectable by the instrument and also providing tactile feedback to a user.

The machine-readable feature may be moulded as part of the cover member material, or it may be applied to the surface of the cover member. Preferably, the feature 104 is circular so that the system is unsusceptible to relative rotation between the cover member and the imaging device (not shown) in the instrument.

Figure 4:
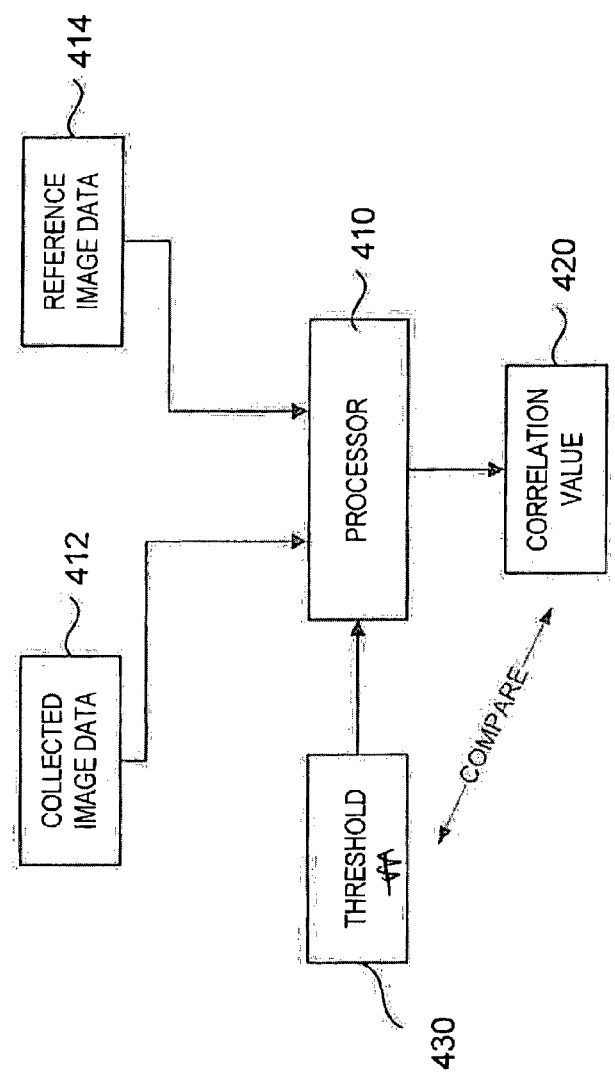
FIG. 4 is a flow chart demonstrating steps in an automated method for detecting presence or absence of a cover member in a treatment assembly, according to an embodiment of the invention.

FIG. 4 is a schematic illustration representing interaction between data obtained by an imager (such as a scanner or camera in the instrument) and a processor 410 for performing a method for detecting automatically an orientation (including presence or absence) of a cover member 100 in a sample treatment assembly such as an instrument 500. The method includes receiving at processor 410 data 412 representing one or more images collected from the sample treatment assembly as well as data 414 representing a reference image. The reference image data represents a "template" of the image that the system is looking for to ascertain the orientation of the cover member. In the embodiment illustrated, this is a ring 104.

The received data representing collected images may contain images representing a plurality of slides in the sample treatment assembly which have been imaged simultaneously. This may enhance processing efficiency, when automatically ascertaining the orientation of more than one cover member in the assembly. Alternatively, the received data representing collected images may pertain to a plurality of slides in the sample treatment assembly, but which have been individually imaged in sequence, rather than simultaneously.

The processor compares reference image data 414 and collected image data 412 to produce a correlation value 420. The correlation value represents how well the image represented by the collected data 412 matches the reference image represented by the reference data 410. This may be achieved using software algorithms designed to compare image data e.g. using iterative techniques. A threshold value is stipulated (typically pre-defined in the algorithm) and when processor 410 determines that the correlation value 420 exceeds the threshold 430, a determination can be made that the cover member 100 is present in the instrument and correctly oriented. In the event that the correlation value 420 does not exceed the threshold 430, then a negative result ensues which typically prompts an error signal for the user to check the presence and orientation of the cover member.

Outputs from the processor may include e.g. a cropped version of the collected image and this may be saved to a storage module in the instrument as evidence of the region that correlated most highly with the reference image; the x and y coordinates of the detected image may also be included. The correlation value may also be stored as well as the final detection result (i.e. true/false). This data can be used in event logs generated by the instrument and audit trails aimed at enhancing efficient operation of the instrument and optimising its use.

The automated method may be embodied in machine-readable code representing instructions executable by processor 410 to perform the method described herein. That code may be updated from time to time e.g. to improve efficiency of image matching algorithms.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components or group thereof.

It is to be understood that various modifications, additions and/or alterations may be made to the parts previously described without departing from the ambit of the present invention as defined in the claims appended hereto.

It is to be understood that the following claims are provided by way of example only, and are not intended to limit the scope of what may be claimed.

The invention claimed is:

1. A cover member for use in treatment of a sample on a substrate, the cover member having fluid flow features for controlling the application and transfer of fluid reagent within a reaction chamber defined by the cover member, and being adapted for use in an instrument, wherein the cover member comprises at least one orientation feature including a human-readable feature also detectable by the instrument for ascertaining absence or presence of the cover member in the instrument, and in the case of presence within the instrument, for ascertaining an orientation of the cover member,
   wherein the at least one orientation feature is incorporated into the cover member, and
   wherein the at least one orientation feature is asymmetrically disposed off-centre relative to a longitudinal axis of the cover member, the longitudinal axis being perpendicular to a shorter and transverse axis of the cover member, and
   wherein, along the longitudinal axis, the at least one orientation feature is disposed closer to a fluid input area of the cover member, at a longitudinal end of the substrate and for receiving the fluid reagent dispensed by the instrument, than to a longitudinal center of the substrate.

2. A cover member according to claim 1, wherein the at least one orientation feature is selected from a group including:
   a. a machine-readable feature;
   b. a mechanical feature; and
   c. a human-readable feature.

3. A cover member according to claim 1, wherein the orientation feature is substantially circular in shape.

4. A cover member according to claim 1, wherein the ascertainable orientation includes a presence or absence of the cover member in the instrument.

5. A cover member according to claim 1, wherein the at least one orientation feature is moulded onto the cover member surface.

6. A cover member according to claim 3, wherein the orientation feature comprises an annulus on a surface of the cover member, the annulus having a substantially a semicircular cross section.

7. A cover member according to claim 1, wherein the cover member is adapted for use in a sample holder receivable by the instrument, and wherein the orientation feature is a protrusion configured to cooperate with a corresponding recess of the sample holder when the cover member is correctly oriented in the sample holder.

8. An automated method for detecting orientation of a cover member in a sample treatment assembly, the method including the steps of:
   a. receiving at a processor data representing one or more images collected from the sample treatment assembly;
   b. receiving at the processor data representing a reference image;
   c. operating the processor to compare the reference image data and the collected image data to produce a correlation value;
   d. determining the presence of a cover member, having fluid flow features for controlling the application and transfer of fluid reagent within a reaction chamber defined by the cover member, in the sample treatment assembly when the correlation value exceeds a threshold value; and
   e. providing in the cover member at least one orientation feature including a human-readable feature also detectable by the sample treatment assembly for ascertaining absence or presence of the cover member in the sample treatment assembly, and in the case of presence within the sample treatment assembly, for ascertaining an orientation of the cover member, the at least one orientation feature being incorporated into the cover member,
   wherein the at least one orientation feature is asymmetrically disposed off-centre relative to a longitudinal axis of the cover member, the longitudinal axis being perpendicular to a shorter and transverse axis of the cover member, and
   wherein, along the longitudinal axis, the at least one orientation feature is disposed closer to a fluid input area of the cover member, at a longitudinal end of the substrate and for receiving the fluid reagent dispensed by the sample treatment assembly, than to a longitudinal center of the substrate.

9. An automated method according to claim 8 wherein the received data representing collected images pertains to a plurality of substrates in the in the sample treatment assembly which have been imaged simultaneously.

10. An automated method according to claim 8, wherein the received data representing collected images pertains to a plurality of substrates in the sample treatment assembly which have been imaged sequentially.

11. The cover member according to claim 1, wherein the at least one orientation feature comprises an RFID tag.

12. The cover member according to claim 1, wherein the at least one orientation feature comprises an infra-red symbol.

13. The cover member according to claim 1, wherein the cover member comprises a second orientation feature overlapping the reaction chamber and comprising at least one word written on the cover member at a second longitudinal end of the substrate opposite the longitudinal end.

* * * * *